(12) United States Patent
Mohapatra

(10) Patent No.: US 7,138,199 B2
(45) Date of Patent: Nov. 21, 2006

(54) FUEL CELL AND FUEL CELL COOLANT COMPOSITIONS

(76) Inventor: Satish C. Mohapatra, 4690 Concord Cir., Easton, PA (US) 18045

( * ) Notice: Subject to any disclaimer, the term of this patent is extended or adjusted under 35 U.S.C. 154(b) by 123 days.

(21) Appl. No.: 10/282,351

(22) Filed: Oct. 30, 2002

(65) Prior Publication Data

US 2004/0086757 A1 May 6, 2004

(51) Int. Cl.
 *H01M 8/04* (2006.01)
 *C09K 5/10* (2006.01)

(52) U.S. Cl. ............................. 429/26; 429/38; 252/73

(58) Field of Classification Search ................. 429/26, 429/12, 20, 38; 252/73, 570, 575
See application file for complete search history.

(56) References Cited

U.S. PATENT DOCUMENTS

| | | | | |
|---|---|---|---|---|
| 3,923,546 A | * | 12/1975 | Katz et al. | 429/13 |
| 3,940,285 A | * | 2/1976 | Nickols et al. | 429/20 |
| 4,312,956 A | * | 1/1982 | Chong et al. | 521/28 |
| 5,073,283 A | * | 12/1991 | Leung et al. | 252/78.5 |
| 6,086,782 A | * | 7/2000 | Hsu et al. | 252/73 |
| 2003/0198847 A1 | * | 10/2003 | Jeffcoate et al. | 429/26 |

FOREIGN PATENT DOCUMENTS

| | | | |
|---|---|---|---|
| CA | 2382930 A1 | * | 4/2001 |
| CA | 2430443 A1 | * | 7/2002 |
| DE | 100 63 951 A | | 6/2002 |
| DE | 101 04 771 A | | 8/2002 |
| WO | WO 00/17951 A | | 3/2000 |
| WO | WO 02/073727 A | | 9/2002 |

* cited by examiner

*Primary Examiner*—Tracy Dove
(74) *Attorney, Agent, or Firm*—Ash Tankha

(57) ABSTRACT

This invention is directed to coolant compositions, particularly coolant compositions useful in fuel cells, and to fuel cells containing such coolant compositions. The coolant compositions or heat transfer fluids of this invention have and retain low electrical conductivity through extended periods of use. These coolants or heat transfer fluids are composed of a base composition and an additive package which imparts the property of retaining low electrical conductivity for extended periods of time. The base composition can be de-ionized water (DI water) alone or a mixture of DI water and a freezing point depressant of the types well-known in the art (e.g., propylene glycol). The additive package contains an organic corrosion inhibitor and a polymeric ion suppressant. The use of both components of the additive package is important.

7 Claims, 4 Drawing Sheets

Fluid: 40% (v/v) 1,3-butanediol + 35% 1,2-propanediol + 25% DI water (B2)
Curve 1: B2 only; Curve 2: B2 + brass coupon; Curve 3: B2 + Stainless Steel
Curve 4: B2 + brass + 1% (wt/wt) benzotriazole (A1) + 0.05% (wt/wt) polymeric ion suppressant (A9)

FUEL CELL AND FUEL CELL COOLANT COMPOSITIONS

FIELD OF THE INVENTION

The invention relates to the field of heat transfer processes. Specifically, the invention concerns heat transfer fluids or coolants for use in the cooling of a fuel cell stack. More specifically, the invention relates to heat transfer fluid compositions comprising blends containing (1) de-ionized water, (2) a freezing point depressant, (3) an organic corrosion inhibitor, and (4) a polymeric ion suppressant specifically selected to react with both positive (cations) and negative ions (anions).

BACK GROUND OF THE INVENTION

A fuel cell generates electrical power by converting the chemical energy of a fuel continuously into electrical energy by way of an electrochemical reaction, silently, without combustion. Fuel cells typically utilize hydrogen as the fuel and oxygen (usually from air) as the oxidant in the electrochemical reaction. The reaction results in electricity, by-product water, and by-product heat. The hydrogen used in the process is derived from fuels such as natural gas, propane, methanol or other petroleum products and the oxygen is drawn from the air.

A polymer electrolyte membrane (PEM) type fuel cell consists principally of two electrodes, the anode and the cathode, separated by a polymer electrolyte membrane. Each of the electrodes is coated on one side with a platinum-based catalyst. Hydrogen fuel is fed into the anode and air enters through the cathode. In the presence of the platinum catalyst, the hydrogen molecule splits into two protons and two electrons. The electrons from the hydrogen molecule flow through an external circuit creating an electrical current. Protons from the hydrogen molecule are transported through the polymer electrolyte membrane and combine at the cathode with the electrons and oxygen from the air, to form water and generate by-product heat. A coolant is usually needed to remove this by-product heat.

Practical fuel cells comprise many cells stacked in series to generate useful voltages and power levels. Many applications could utilize the heat generated by the fuel cell for various purposes such as water heating, space heating, and industrial uses. Common fuels (e.g. natural gas, propane, and methanol) can be utilized along with a fuel processing sub-system that converts the fuel into a hydrogen-rich gas.

Fuel cell systems are attractive power generation devices because of their inherently high efficiency; very low noxious emissions; low noise; ability to utilize by-product heat (co-generation); and modularity of construction, allowing them to be manufactured in virtually any size and even clustered to suit application requirements.

Presently, the most widely used coolant for fuel cell stack cooling is deionized (DI) water. DI water can have an electrical resistivity as high as 18 megaohm.cm, and with very high specific heat, thermal conductivity and low viscosity. DI water is a highly efficient cooling media. However, resistivity decreases with time because DI water easily picks up ions from metals and other sources. In addition, water freezes at 0° C. thus making DI water alone unsuitable for use in colder places.

It would seem that the use or addition of the commonly used automotive coolants or freezing point depressants should solve the freezing problem in such low temperature applications. Unfortunately, the typical ethylene glycol and propylene glycol based automotive antifreezes are very conductive to electricity due to the presence of salt based corrosion inhibitors normally employed in such products. Furthermore, glycols tend to form glycolic acid causing corrosion of metal components which ultimately increases the electrical conductivity of the coolant.

Hydrocarbon and silicone based fluids while having some of the desirable characteristics of a fuel cell coolant are flammable and not compatible with commonly used gaskets and hose materials such as silicone and ethylene propylene-diene monomer (EPDM). Typically employed fluorocarbons, such as hydrofluoro ethers (HFEs) and perfluorinated ethers have many good properties for a fuel cell coolant, but the cost of fluorinated compounds is very high and generally makes their use in fuel cell applications (particularly civilian applications) prohibitively expensive. Additionally, the current thrust is to reduce the manufacturing and operating costs of a fuel cell so as to be used efficiently in residential and automotive applications.

As a general rule, coolants—particularly those used in fuel cells, especially PEM based fuel cells, usually must have a Flash Point greater than 93.33° C. (i.e., non-flammable for transportation purposes, a DOT regulation). Additionally, these coolants are generally required to have a Freezing Point below 0° C., preferably below about −40° C. and, advantageously below about −50° C. Further such coolants must be compatible with the various components of the cooling system, including, for example, silicone, EPDM, nitrile and various plastics. In addition, the coolants should be thermophysically efficient, i.e. low viscosity, high specific heat and thermal conductivity. Finally, one of the most important properties of such coolants is to have and to maintain a low Electrical Conductivity (micro Siemen/cm). While the electrical conductivity required in different applications may vary substantially, the extremely low value of 0.5 micro Siemen/cm (μS/cm) sustainable for any significant time is excellent. In other instances higher conductivities may be quite satisfactory, such as, for example at times as high as about 5 μS/cm. Usually, however it is desirable to retain the conductivity of a fuel cell coolant below about 2 and preferably below about 1.5 or even 1.0 μS/cm.

Thus, while the prior art has suggested several coolant materials for use in fuel cells and elsewhere, the prior art suggestions all have some shortcomings.

SUMMARY OF THE INVENTION

The present invention provides a coolant or heat transfer fluid composition that addresses the shortcomings of prior art coolants and comprises a base composition (which can be a mixture of components) and an additive package. The base composition addresses the freezing point, flash point, material compatibility and thermophysical property requirements of the fluid, whereas, the additive package is designed to maintain the electrical conductivity at a desired low level. The heat transfer or coolant composition of this invention is generally useful in all applications requiring a heat transfer fluid, but is particularly well suit to applications in the cooling of fuel cells or fuel cell stacks.

The heat transfer fluid or coolant composition of this invention is comprised of a base composition and an additive package.

The base composition can be comprised completely of DI water or it can be comprised of a mixture of DI water with a freezing point depressant and, optionally, other components.

The additive package comprises an organic corrosion inhibitor and a polymeric ion suppressant.

DETAILED DESCRIPTION OF THE INVENTION

While the base component of the heat transfer fluid or coolant of this invention can be comprised solely of DI water, typically, the heat transfer fluid or coolant composition of this invention will have a base composition comprising from about 10 to about 90% by volume DI water and from about 90 to about 10% by volume freezing point depressant and optionally other components. The freezing point depressant can be any one of those materials well-known to the art. Illustrative of such materials are: ethylene glycol, propylene glycol, 1,3-butanediol, glycerol, and other alcohols. Many of these materials have been employed in automotive coolants.

It is desirable that the DI water comprise at least about 15% by volume of the base composition and preferably at least about 25% by volume. On the other hand, the amount of DI water in the base composition can be as high as about 50% and even as high as about 75% by volume.

While other components can be included in the base composition of this invention, it is not unusual that the balance of the base composition (i.e., other than the DI water) be comprised of substantially a freezing point depressant. Thus, the freezing point depressant, either a single compound or a mixture of two or more compounds, can comprise up to about 90% by volume of the total heat transfer fluid or coolant composition. Conversely, I have found, especially when a low temperature application is contemplated, that it is desirable that the coolant composition contain at least about 10% by volume of freezing point depressant and advantageously at least about 25% by volume, with concentrations of at least about 50% not being unusual. Although concentrations of freezing point depressant as high as about 90% by volume can be employed, concentrations of up to about 75 or 80% are more typical.

The additive package of this invention comprises (1) an organic corrosion inhibitor and (2) a polymeric ion suppressant.

Generally, the corrosion inhibitors previously suggested for use in coolants are ionic in nature. The corrosion inhibitor of this invention, however, is organic in nature (and generally non-ionic). Illustrative of such organic materials are azoles, aromatic hydroxy compounds, and amines. Examples of suitable azoles include benzotriazole, tolyltriazole, methyl benzotriazoles (e.g., 5-methyl-1H-benzotriazole), mercaptobenzoimidazole (e.g., 2-mercaptobenzoimidazole), and mercaptobenzothiazole. Similarly, suitable aromatic hydroxy compounds include salicylaldoxime, salicyl alcohol, methyl gallate, propyl gallate, octyl gallate, and dodecyl gallate. Further, suitable amines preferably include alcohol amines, for example, monoethanol amine, diethanol amine, triethanol amine, and morpholine. These organic corrosion inhibitors can be used alone or in combination with each other. It is believed that these are well known corrosion inhibitors function by providing a surface film to prevent exposure of the materials of the cell and cell stack to the coolant composition.

Generally, these corrosion inhibitors can be present in the heat transfer fluids or coolants of this invention in amounts ranging from about 0.01 per cent by weight up to about 5 per cent by weight. Usually, however, the corrosion inhibitor will be present in an amount of at least about 0.05 per cent by weight, and preferably in an amount of at least about 0.1 per cent by weight. Conversely, the amount of corrosion inhibitor in the heat transfer fluids or coolants of this invention are generally present in an amount of less than about 2 per cent by weight, with amounts of up to about 1 per cent by weight being quite satisfactory.

The polymeric ion suppressant of this invention must react with both positive ions (cations) and negative ions (anions). Thus, for example the ion suppressant material of this invention can comprise a polymer with an acid group—to absorb or react with cations—and a polymer with a basic/alkaline group—to absorb or react with anions.

The polymeric ion suppressants of this invention can be in a solid form dispersed in the coolant composition. While the polymeric ion-suppressants tend to operate in a manner similar to solid ion exchange resins in water treatment processes, the ion suppressants of this invention are much smaller in size—less than about 10 micron (for example in the range of from about 5 to about 15 micron) compared to ion exchange resins, which have a size usually greater than about 100 microns. Thus the size of the solid polymeric ion suppressants of this invention are sufficiently small so that they can be suspended in the coolant fluid without causing clogging of the pipes and passageways of the fuel cell or stack. Conversely, the size of the polymeric material must be sufficiently large so that it does not move appreciably in an electric field (between electrodes) to cause electrical conductivity.

Polymers with acid groups (sulfonic, acrylic, carboxylic etc.) can be used to absorb or react with cations (metal ions) from the fluid while polymers with basic/alkaline (amine) group can be used to absorb or react with anions. After the ion-exchange reaction, $H_2O$ is formed from $H^+$ and $OH^-$ ions. Materials of this type are well-known in the art and are of type described, for example, in U.S. Pat. No. 4,312,956.

In accordance with this invention, the polymeric ion suppressant can be present in the heat transfer fluid or coolant composition in an amount of from about 0.01 up to about 3 or 4 per cent by weight. Preferably, the ion suppressant is present in an amount of at least about 0.05 per cent by weight. It is usually preferable to maintain the amount of ion suppressant at a level of about 2 per cent by weight or less because of the cost of the material and the fact that at times higher concentrations of the ion suppressant tend to have an adverse effect upon the thermophysical properties of the coolant composition or heat transfer fluid.

The polymeric ion suppressants suitable for use in this invention are commercially available from many sources and are sold under the brand names such as Dowex® and Amberlite®. The polymeric material can be treated with an acid to yield a material with acid or cationic functionality. Generally any acid is acceptable, including well known carboxylic acids such as formic acid and acetic acid. It has been found that strong acids, such as sulfuric acid, are particularly well-suited for this employment. Conversely, the polymeric material can be treated to ensure a basic or anionic functionality. This is not quite so straight forward a process and typically requires a multiple reactions, for example, reaction with a material such as $ClCH_2OCH_3$ to provide a methyl chloride substituent, followed by reaction with a quaternary ammonium salt and then washing with an hydroxide solution (e.g., sodium hydroxide) the remove the chlorine and leave an OH substituent. Further information regarding this well known procedure can be found in the publication by The Dow Chemical Company "DOWEX Ion Exchange Resins; Fundamentals of Ion Exchange" published in June 2000 and based upon the work of R. M. Wheaton and L. J. Lefevre. The acid and base treated polymeric materials are then mixed in a 1:1 weight proportion to create a mixed resin bed capable of exchanging with both anionic and cationic functional groups in the heat transfer or coolant fluid. Thus, free ions in the fluid, such as, metal ions, chloride, sulfate, carbonate, carboxylic acid, etc., become immobilized in the polymeric ion suppressants and do not move in an electric field.

DRAWINGS

Figure 1:
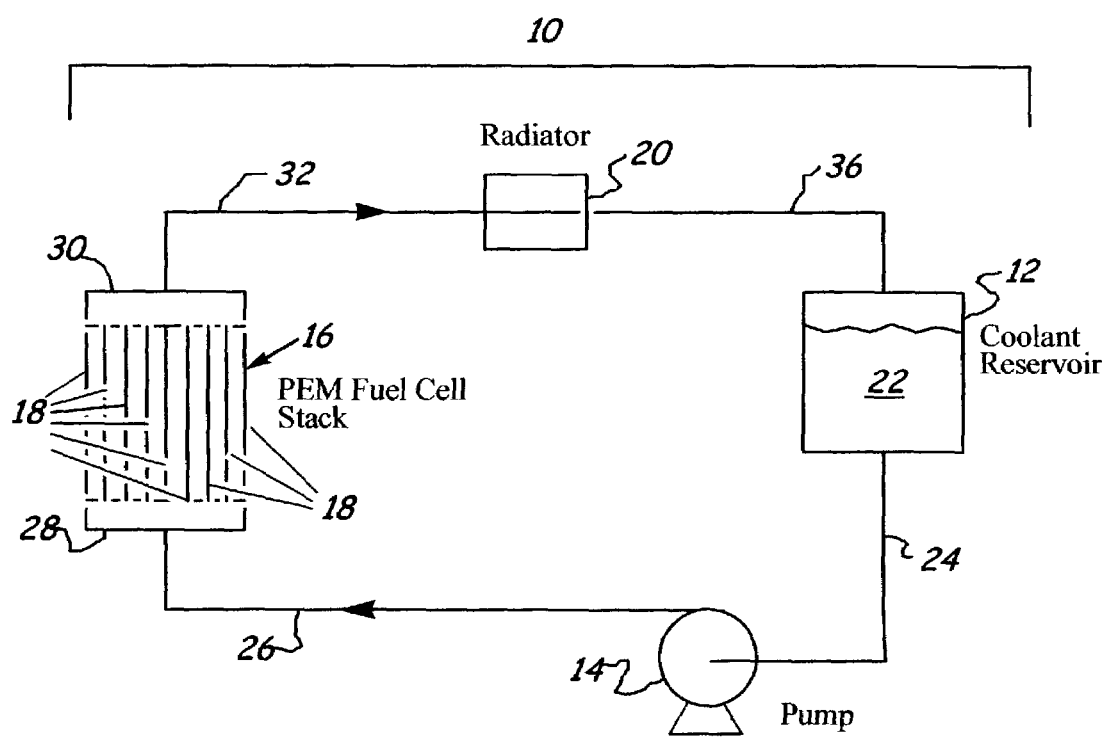
FIG. 1 is a schematic flow diagram of a typical PEM type fuel cell coolant loop.

In FIG. 1 there is shown a fuel cell coolant loop 10 containing a coolant reservoir 12, a pump 14, a fuel cell stack 16 comprised of a multiplicity of fuel cells 18, a radiator 20 and interconnecting lines as described below.

In operation, cool fuel cell coolant or heat transfer fluid 22 flows from coolant reservoir 12 by means of line to pump 14. The coolant 22 is then pumped by means of pump 14 through line 26 into bottom manifold 28 of the fuel cell stack 16 and thence through the fuel cell stack 16 in contact with the fuel cells 18. As the coolant 22 passes in contact with the fuel cells 18, heat is transferred from the fuel cells 18 to the coolant 22. The warmed coolant 22 from fuel cell stack 16 passes through top manifold 30 and thence via line 32 into radiator 20 where it is cooled. The cooled coolant 22 is then returned via line 36 to reservoir 12 to complete the coolant loop.

Figure 2:
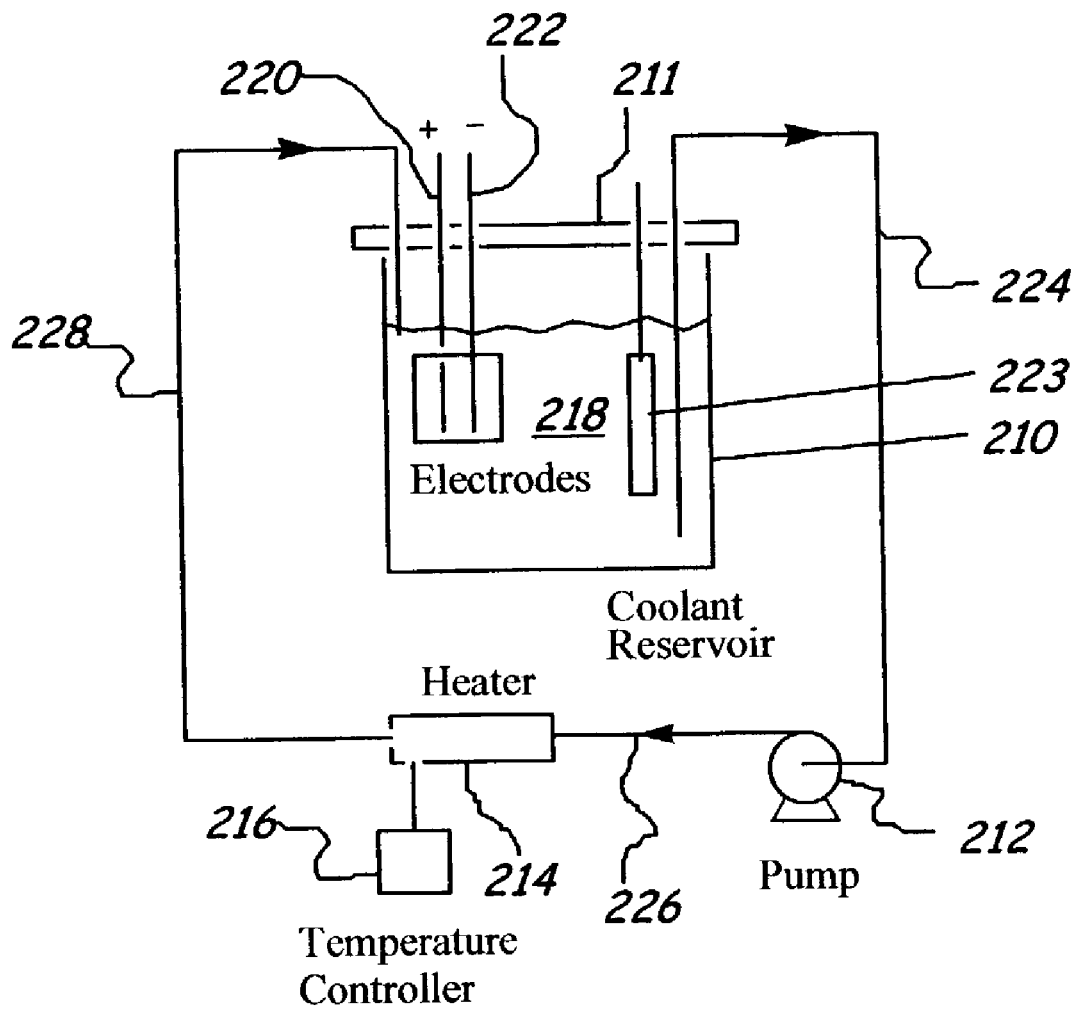
FIG. 2 is a schematic illustration of an apparatus used to conduct dynamic testing of coolant fluids.

In FIG. 2 there is shown an apparatus designed to conduct the continuous testing of coolant compositions and includes a glass coolant reservoir 210 with a cover 211 having entrance and exit ports for the items described below, a pump 212, a heater 214, and a temperature controller 216. In coolant reservoir 210, there is contained a quantity of the coolant fluid 218 to be tested. Immersed in the coolant fluid 218 are comb-like positive 220 and negative 222 electrodes connected to a low voltage (about 6 volts, e.g. a battery) electric source through a rheostat, not shown. Also immersed in coolant fluid 218 there is a conductivity probe 223. This permits the determination of the conductivity of the coolant fluid 218.

In operation, the coolant reservoir 210 is charged with coolant fluid 218 to be tested. In a closed cycle, coolant fluid 218 is removed from coolant reservoir by means of line 224 passing through cover 211 and passed to pump 212. Pump 212 then moves the coolant fluid 218 first to heater 214 by means of line 226 and then by means of line 228 through cover 211 back to coolant reservoir 210.

During the course of a test run, temperature controller 216 operates to control heater 214 so as to maintain a desired temperature of the coolant fluid 218 in coolant reservoir 210. At various time intervals during a test run, the conductivity of the coolant fluid 218 in coolant reservoir 210 is measured by means of conductivity probe 223 and recorded.

EXAMPLES

In the following Examples a variety of base compositions are illustrated and for ease of employment in the descriptions below the compositions comprising DI water plus freezing point suppressants have been designated by the letter "B" and a number. The various base compositions and their respective components (expressed as percentages by volume) are set forth below:

| | |
|---|---|
| B1: | 40% glycerol; + 35% propylene glycol + 25% DI water |
| B2: | 40% 1,3-Butanediol + 35% propylene glycol + 25% DI Water |
| B3: | 55% Propylene glycol + 45% DI Water |
| B4: | 55% Ethylene glycol + 45% DI Water |
| B5: | 10% Propylene glycol + 90% DI Water |
| B6: | 10% Ethylene glycol + 90% DI Water |
| B7: | 90% Propylene glycol + 10% DI Water |
| B8: | 90% Ethylene glycol + 10% DI Water |
| B9: | 50% Propylene glycol + 50% DI Water |
| B10: | 50% Ethylene glycol + 50% DI Water |

The materials added to the base compositions in the following examples are designated by the letter "A" and a number, with the numbers 1 through 5 indicating organic corrosion inhibitors and the numbers 8 through 10 indicating polymeric ion suppressants. The additive package required by this invention comprises one or more of the materials A1 through A5 together with one or more of the materials A8 through A10. The various additive materials are set forth below:

Organic Corrosion Inhibitors

A1: Benzotriazole
A2: Mercaptobenzothiazole
A3: 5-methyl-1H-benzotriazole
A4: 2-mercaptobenzoimidazole
A5: Salicylaldoxime Polymeric Ion Suppressants A8: Mixed ion-exchange particles (both cationic and anionic) made of polystyrene (PS)/divinyl benzene (DVB) copolymer, particle size 16–50 mesh, moisture content approximately 60% by weight, and exchange capacity 0.55 meq/mL (Amberlite® MB-150). This material was ground to a particle size of about 10 microns.

A9: Mixed ion-exchange particles (both cationic and anionic) made of polystyrene (PS)/divinyl benzene (DVB) copolymer, uniform 360 μm for cation exchange particles, uniform 590 μm for anion exchange particles, moisture content approximately 53% by weight, and exchange capacity 1.0 meq/mL (Dowex® MR-450). Again this material was ground to a particle size of about 10 microns.

A10: Mixed ion-exchange particles (both cationic and anionic) made of polystyrene (PS)/divinyl benzene (DVB) copolymer, particle size 20–50 mesh, moisture content approximately 55% by weight, and exchange capacity 1.0 meq/mL (Dowex® MR-3). As with A8, this material was also ground to a particle size of about 10 microns.

In the following Examples 1 through 15, samples of about 100 ml of each of the coolant materials described in the particular Example are placed in four-ounce canning jars. In some of the samples metal coupons [Brass, Stainless Steel (SS), Aluminum (A1)] are placed in the jars (to simulate the situation in a fuel cell system wherein the coolant would be in contact with metallic components). In the samples containing corrosion inhibitors A1 through A5, the corrosion inhibitors are present in the amount of about 0.1% by weight. In the samples containing polymeric ion suppressants A8 through A10, the ion suppressants are present in the amount of about 0.1% by weight. The samples are raised to an elevated temperature (of at least about 70° C.) in order to accelerate degradation of conductivity and the conductivity is measured for each of the coolant samples. The jars are then sealed and placed in an oven to maintain the temperature of the coolants in the jars at the selected elevated temperature. The coolant samples are maintained at these rigorous conditions for various periods. Periodically during the duration of the several examples, the temperature of the coolant is reduced to room temperature (22° C.) and the conductivity of the particular coolant samples is measured. When the run is to be continued, the temperature of the coolant sample is then raised back to the particular elevated temperature.

Example 1

In this Example five separate samples of (1) a base composition alone, (2) the base composition with a brass coupon, (3) the base composition with brass coupon and an organic corrosion inhibitor, (4) the base composition with brass coupon and a polymeric ion suppressant and (5) the base composition with brass coupon and both an organic corrosion inhibitor and a polymeric ion suppressant [in accordance with this invention] were prepared and tested. The particular components and the conductivity of the compositions obtained after two weeks are shown in Table 1, below

TABLE 1

| (1) B1 | 1.2 µSiemens/cm |
|---|---|
| (2) B1 + Brass: | 3.1 µSiemens/cm |
| (3) B1 + Brass + A1: | 1.5 µSiemens/cm |
| (4) B1 + Brass + A9: | 2.6 µSiemens/cm |
| (5) B1 + Brass + A1 + A9: | <0.3 µSiemens/cm |

From the above data it will be seen that the base composition (1) comprised of glycerol; propylene glycol and DI water [in the proportions indicated above for B1] was determined to have a conductivity of 1.2 µS/cm. When the sample (2) containing B1 and a brass coupon was tested at the end of two weeks, it was found that the conductivity had increased substantially to a level of 3.1 µS/cm. This was due to the increased number of ions, contributed by the brass coupon, which were present in this sample. While the sample (3) that also contained benzotriazole as the organic corrosion inhibitor had a lower conductivity, 1.5 µS/cm, than sample (2), its conductivity was still relatively high. Similarly, the conductivity of sample (4) that contained only the finely divided PS/DVB particles as a polymeric ion suppressant was only slightly reduced to a level of 2.6 µS/cm at the end of two weeks.

As distinguished from the results obtained with the first four samples of this example, when using the coolant composition of this invention (i.e., containing both the organic corrosion inhibitor—benzotriazole and the polymeric ion suppressant) the conductivity of this sample (5) was determined to be less than 0.3 µS/cm (the lowest value that the equipment utilized can detect). It should be noted that this is an order of magnitude different from the conductivities of all of the other samples and is less than 1/10 of the conductivity detected for sample (2) consisting of only the base composition in the presence of the brass coupon.

Example 2

In this Example five other separate samples of (1) a base composition alone, (2) the base composition with a brass coupon, (3) the base composition with brass coupon and an organic corrosion inhibitor, (4) the base composition with brass coupon and a polymeric ion suppressant and (5) the base composition with brass coupon and both an organic corrosion inhibitor and a polymeric ion suppressant [in accordance with this invention] were prepared and tested. The particular components and the conductivity of the compositions obtained are shown in Table 2, below.

TABLE 2

| (1) B2: | 1.6 µSiemens/cm |
|---|---|
| (2) B2 + Brass: | 1.5 µSiemens/cm |
| (3) B2 + Brass + A1: | 1.4 µSiemens/cm |
| (4) B2 + Brass + A9: | 0.7 µSiemens/cm |
| (5) B2 + Brass + A1 + A9: | <0.3 µSiemens/cm |

Again, using a base composition of 1,3-butanediol, propylene glycol, and DI water in the proportions set forth above and making the same comparison tests as described in Example 1, it will be seen that at the end of a two week period it was only sample (5)—the composition of this invention—that yielded the lowest and substantially unchanged conductivity of less than 0.3 µS/cm.

Example 3

In this Example the same base composition, organic corrosion inhibitor, and polymeric ion suppressant as used in Example 1 were employed, but a stainless steel coupon was employed rather than brass. Although stainless steel does not put as many conductive ions into the composition as brass, it is a material used in many fuel cells and their cooling systems and needs to be considered.

Thus, in this Example the base composition alone showed the same 1.2 µS/cm at the end of two week as in Example 1. In the sample containing a stainless steel coupon the conductivity rose to 1.3 µS/cm at the end of two weeks. There is no significant change when an organic corrosion inhibitor is added to the sample composition. With the addition of only the small particle size polymeric ion suppressant—PS/DVB—the conductivity was slightly reduced (0.9 µS/cm) from that obtained with the sample containing just the stainless steel coupon. In the case of a sample with a stainless steel coupon and both the organic corrosion inhibitor (benzotriazole) and the polymeric ion suppressant designates as A9 in accordance with this invention, the conductivity remained at less than 0.3 µS/cm for a two week period.

Example 4

Again, the procedure of Example 3 was followed but using the base composition B2. As with Example 2, the conductivity at the end of two weeks for the B2 base composition alone was 1.6 µS/cm, while the conductivity for the base composition containing a stainless steel coupon was only 1.4 µS/cm. The inclusion of organic corrosion inhibitor A1 alone results in no substantial change in the conductivity of the sample. When polymeric ion suppressant A9 was used alone, the conductivity detected at the end of two weeks was 0.8 µS/cm. When the coolant composition in accordance with this invention (containing both corrosion inhibitor A1 and ion suppressant A9) was employed, however, the conductivity remained at less than 0.3 µS/cm for the two week period.

Example 5

In this Example a series of samples was prepared using base composition B1. The metal coupon employed was brass and the additives included A1 through A4 and A8 through A10, either alone or in combination as indicated in Table 5 below. The results shown in Table 5 below are all for a period of 2 weeks unless stated otherwise in the Table.

TABLE 5

| | |
|---|---|
| (1) B1: | 1.2 μSiemens/cm |
| (2) B1 + Brass: | 3.1 μSiemens/cm |
| (3) B1 + Brass + A2 (19 days): | 1.5 μSiemens/cm |
| (4) B1 + Brass + A9: | 2.6 μSiemens/cm |
| (5) B1 + Brass + A2 + A9: | <0.3 μSiemens/cm |
| (6) B1 + Brass + A3 (19 days): | 1.2 μSiemens/cm |
| (7) B1 + Brass + A3 + A9: | <0.3 μSiemens/cm |
| (8) B1 + Brass + A4 (19 days): | 2.3 μSiemens/cm |
| (9) B1 + Brass + A4 + A9: | <0.3 μSiemens/cm |
| (10) B1 + Brass + A8: | 2.8 μSiemens/cm |
| (11) B1 + Brass + A1 + A8: | <0.3 μSiemens/cm |
| (12) B1 + Brass + A10: | 4.3 μSiemens/cm |
| (13) B1 + Brass + A1 + A10: | <0.3 μSiemens/cm |

The data in this Example again demonstrate the unexpectedly superior results obtained with the present invention. Thus, sample (1) comprised of base composition B1 had a conductivity of 1.2 μS/cm at the end of two weeks. Sample (2) containing a brass coupon had a conductivity of 3.1 μS/cm at the end of two weeks. Sample (3), which contained a brass coupon and additive A2 (the organic corrosion inhibitor, mercaptobenzothiazole) showed a conductivity of 1.5 μS/cm at the end of 19-day period and Sample (4) which contained a brass coupon and additive A9 (the polymeric ion suppressant Dowex® MR-450) had a conductivity of 2.6 μS/cm. As distinguished from the foregoing results, Sample 5 containing a brass coupon and both an organic corrosion inhibitor (A2) and a polymeric ion suppressant (A9) in accordance with this invention had a conductivity at the end of two weeks of less than 0.3 μS/cm.

Similarly, Sample (6) comprised of base composition B1 with a brass coupon and organic corrosion inhibitor A3 had a conductivity of 1.2 μS/cm at the end of nineteen days, while Sample (7) including base composition B1 with a brass coupon and containing both ionic corrosion inhibitor A3 and polymeric ion suppressant A9 had a conductivity of less than 0.3 μS/cm at the end of two weeks.

Samples (8) and (9) make a similar comparison with base composition B1 containing a brass coupon and ionic corrosion inhibitor A4 (2-mercaptobenzoimidazole) alone and a coolant in accordance with this invention containing both ionic corrosion inhibitor A4 and polymeric ion suppressant A9. In this situation Sample (8) had a conductivity of 2.3 μS/cm at the end of 19 days, while Sample (9) in accordance with this invention has a conductivity of less that 0.3 μS/cm after two weeks.

Comparison of Sample (10) with Sample (11) and comparison of Sample (12) with Sample (13) illustrate and the advantageous results obtained with two more coolants in accordance with this invention. Thus Sample (10) showed a conductivity of 2.8 μS/cm after two weeks, while Sample (11), containing both ionic corrosion inhibitor A1 and polymeric ion suppressant A8, in accordance with this inventions showed a conductivity of less than 0.3 μS/cm after two weeks. Similarly, Sample (12) showed a conductivity of 4.3 μS/cm after two weeks, while Sample (13), containing both ionic corrosion inhibitor A1 and polymeric ion suppressant A10, in accordance with this invention, showed a conductivity of less than 0.3 μS/cm after two weeks.

Example 6

In this Example four separate samples of (1) base composition B1 with an aluminum coupon, (2) base composition B 1 with aluminum coupon and organic corrosion inhibitor A1, (3) base composition B1 with aluminum coupon and polymeric ion suppressant A9, and (4) base composition B1 with aluminum coupon and both an organic corrosion inhibitor A1 and polymeric ion suppressant A9 [in accordance with this invention] were prepared and tested. The particular components and the conductivity of the compositions obtained at the end of two weeks are shown in Table 6, below

TABLE 6

| | |
|---|---|
| (1) B1 + Aluminum: | 1.9 μSiemens/cm |
| (2) B1 + Aluminum + A1: | 2.2 μSiemens/cm |
| (3) B1 + Aluminum + A9: | 0.6 μSiemens/cm |
| (4) B1 + Aluminum + A1 + A9: | <0.3 μSiemens/cm |

Example 7

In this Example a samples was prepared employing base composition B2 with an aluminum coupon and containing both organic corrosion inhibitor A1 and polymeric ion suppressant A9 in accordance with this invention. After having been maintained at an elevated temperature of 70° C. for eleven days, the sample showed a conductivity of less than 0.3 μS/cm.

Example 8

This Example illustrates the operability of this invention when operating to provide a reduced conductivity for coolants at a level above the minimum detected by the instrumentation. A series of samples was prepared in which each sample contained a brass coupon. In Samples 1 through 4 the base composition was B3, while the base composition in Samples 5 through 8 was B4. In Samples 1 and 5, the there were no additive compositions, while organic corrosion inhibitor A1 was employed in Samples 2 and 6. In Samples 3 and 7, polymeric ion suppressant A10 was employed. In Samples 4 and 8, however, both the organic corrosion inhibitor A1 and the polymeric ion suppressant A10 were used in accordance with this invention. The conductivities for each of the Samples was measured after being maintained at an elevated temperature of 70° C. for five days.

TABLE 8

| | |
|---|---|
| (1) B3 + Brass: | 4.4 μSiemens/cm |
| (2) B3 + Brass + A1: | 4.3 μSiemens/cm |
| (3) B3 + Brass + A10: | 1.3 μSiemens/cm |
| (4) B3 + Brass + A1 + A10: | 0.9 μSiemens/cm |
| (5) B4 + Brass: | 16.1 μSiemens/cm |
| (6) B4 + Brass + A1: | 12.4 μSiemens/cm |
| (7) B4 + Brass + A10: | 3.6 μSiemens/cm |
| (8) B4 + Brass + A1 + A10: | 1.1 μSiemens/cm |

The data shows that the conductivities for Samples 4 and 8 were significantly lower than those for the other samples. More particularly, the data show that the presence of both the organic corrosion inhibitor A1 and the polymeric ion suppressant A10 in accordance with this invention were effective to retain the conductivity at levels lower than that achieved with either A1 or A10 alone.

Example 9

In this Example a series of comparative samples were prepared using various base compositions other than those employed in the previous Examples. Each of the samples contained a brass coupon. For each base composition a comparative sample containing both organic corrosion inhibitor A1 and polymeric ion suppressant A10. All of the samples were maintained at a temperature of 70° C. for a period of 6 days and the conductivity for each sample was determined. The results are shown in Table 9, below.

TABLE 9

| | |
|---|---|
| B5 + Brass: | 18.7 μSiemens/cm |
| B5 + Brass + A1 + A10: | 4.9 μSiemens/cm |
| B6 + Brass: | 21.5 μSiemens/cm |
| B6 + Brass + A1 + A10: | 4.5 μSiemens/cm |
| B8 + Brass: | 2.9 μSiemens/cm |
| B8 + Brass + A1 + A10: | 0.6 μSiemens/cm |
| B9 + Brass: | 5.0 μSiemens/cm |
| B9 + Brass + A1 + A10: | 1.0 μSiemens/cm |
| B10 + Brass: | 9.1 μSiemens/cm |
| B10 + Brass + A1 + A10: | 1.5 μSiemens/cm |

From the above data it can be seen that combination of an organic corrosion inhibitor and a polymeric ion suppressant in accordance with this invention is operative with and effective to retain the conductivity of a variety of base compositions at low levels and significantly lower levels than achieved without the combined additives of this invention.

Example 10

In this Example four separate samples of (1) base composition B7 with a brass coupon, (2) base composition B7 with a brass coupon and organic corrosion inhibitor A1, (3) base composition B7 with a brass coupon and polymeric ion suppressant A10, and (4) base composition B71 with a brass coupon and both an organic corrosion inhibitor A1 and polymeric ion suppressant A10 [in accordance with this invention] were prepared and tested. The particular components and the conductivity of the compositions obtained at the end of two weeks are shown in Table 10, below

TABLE 10

| | |
|---|---|
| (1) B7 + Brass: | 1.2 μSiemens/cm |
| (2) B7 + Brass + A1: | 1.7 μSiemens/cm |
| (3) B7 + Brass + A10: | 1.1 μSiemens/cm |
| (4) B7 + Brass + A1 + A10: | <0.3 μSiemens/cm |

Example 11

In this Example the base composition consists essentially of DI water without any freezing point suppressants. Separate samples are prepared using (1) base composition alone, (2) base composition with 0.01% by weight benzotriazole as an organic corrosion inhibitor, (3) base composition with 2% by weight of Dowex® MR-450, a polymeric ion suppressant having both acidic groups and basic groups, (4) base composition with both the organic corrosion inhibitor and with the polymeric ion suppressant.

A brass coupon is placed in each sample and the samples are raised to temperature of about 70° C. In extended tests Sample (1), (2) and (3) show a significant increase in conductivity, while Sample (4) retains a low conductivity.

Example 12

In this Example a base composition containing about 60% by volume DI water and about 40% by volume 1,3-butanediol as the freezing point depressant is employed with about 1% by weight Amberlite® MB-150, ground to a particle size of less than about 10 microns, as the polymeric ion suppressant. A series of seven samples are prepared using the base composition with the ion suppressant as described above. To six of the samples are added one of the following aromatic hydroxy type corrosion inhibitors in an amount of about 3% by weight: salicylaloxime; salicy alcohol; methyl gallate; propyl gallate; octyl gallate; and dodecyl gallate.

A brass coupon is placed in each sample and the samples are raised to a temperature of about 70° C. Over an extended period of time, the sample without a corrosion inhibitor shows a substantial increase in conductivity, while all of the six samples containing both the ion suppressant and an aromatic corrosion inhibitor in accordance with this invention retain a low conductivity.

Example 13

In this Example a base composition containing about 10% by volume DI water and about 90% by volume propylene glycol as the freezing point depressant is employed with about 0.75% by weight Dowex®) MR-450, ground to a particle size of less than about 10 microns, as the polymeric ion suppressant. A series of four samples are prepared using the base composition with the ion suppressant as described above. To three of the samples are added one of the following amine type corrosion inhibitors in an amount of about 0.01% by weight: monoethanol amine, diethanol amine, and triethanol amine.

A brass coupon is placed in each sample and the samples are raised to a temperature of about 70° C. Over an extended period of time, the sample without a corrosion inhibitor shows a substantial increase in conductivity, while all of the three samples containing both the ion suppressant and an aromatic corrosion inhibitor in accordance with this invention retain a low conductivity.

Example 14

In this Example a base composition containing about 15% by volume DI water and about 85% by volume ethylene glycol as the freezing point depressant is employed with about 0.5% by weight Dowex® MR-3, ground to a particle size of less than about 10 microns, as the polymeric ion suppressant. A series of four samples are prepared using the base composition with the ion suppressant as described above. To three of the samples are added one of the following amine type corrosion inhibitors in an amount of about 0.01% by weight: monoethanol amine, diethanol amine, and triethanol amine.

A brass coupon is placed in each sample and the samples are raised to a temperature of about 70° C. Over an extended period of time, the sample without a corrosion inhibitor shows a substantial increase in conductivity, while all of the three samples containing both the ion suppressant and an aromatic corrosion inhibitor in accordance with this invention retain a low conductivity.

Example 15

In this Example a base composition containing about 80% by volume DI water and about 20% by volume 1,3-butanediol as the freezing point depressant is employed with about 0.05% by weight Dowex® MR-3, ground to a particle size of about 25 microns, as the polymeric ion suppressant. A series of two samples are prepared using the base composition with the ion suppressant as described above. To one of the samples is added tolyltriazole as the azole type corrosion inhibitor in an amount of about 5% by weight. A brass coupon is placed in each sample and the samples are raised to a temperature of about 70° C. Over an extended period of time, the sample without a corrosion inhibitor shows a substantial increase in conductivity, while the sample containing both the ion suppressant and an aromatic corrosion inhibitor in accordance with this invention retains a low conductivity.

Example 16

In this Example the conductivity of each of several samples of heat transfer fluids was determined using a method as illustrated and described in connection with FIG. 3. The base fluid was comprised of 40% by volume 1,3-butanediol, 35% by volume 1,2-propanediol and 25% by volume DI water. This material is also identified above as B2.

In the course of this Example four separate and different runs were conducted, each run extending for more than 30 days. In each run the temperature of the particular coolant fluid was maintained at a temperature of over 155° F.

In Run 1, the coolant fluid described and identified above as B2 was tested for a period of 33 days and 23 separate readings of conductivity were taken during the period of this run. In Run 2 of this Example, coolant fluid B2 was again employed, but in this run a brass coupon was immersed in the coolant fluid in the reservoir. Again the run extended for a period of 33 days and 23 separate readings of conductivity were taken during the term of the run. In Run 3 of this Example, the same coolant fluid B2 was employed but having a stainless steel coupon immersed in the coolant fluid (instead of a brass coupon) during the course of the run. This run also extended for a period of 33 days, during which 23 separate conductivity readings were taken. Finally, Run 4 was conducted utilizing the same base coolant fluid B2 as in the previously described runs, but in this run the coolant fluid also contained as the additive package in accordance with this invention 1% by weight of the organic corrosion inhibitor benzotriazole (described above as A1) and 0.05% by weight of the polymeric ion suppressant Dowex® MR-450 (described above as A9). Run 4 extended for a period of 35 days, during which 24 separate conductivity readings were taken.

Figure 3:
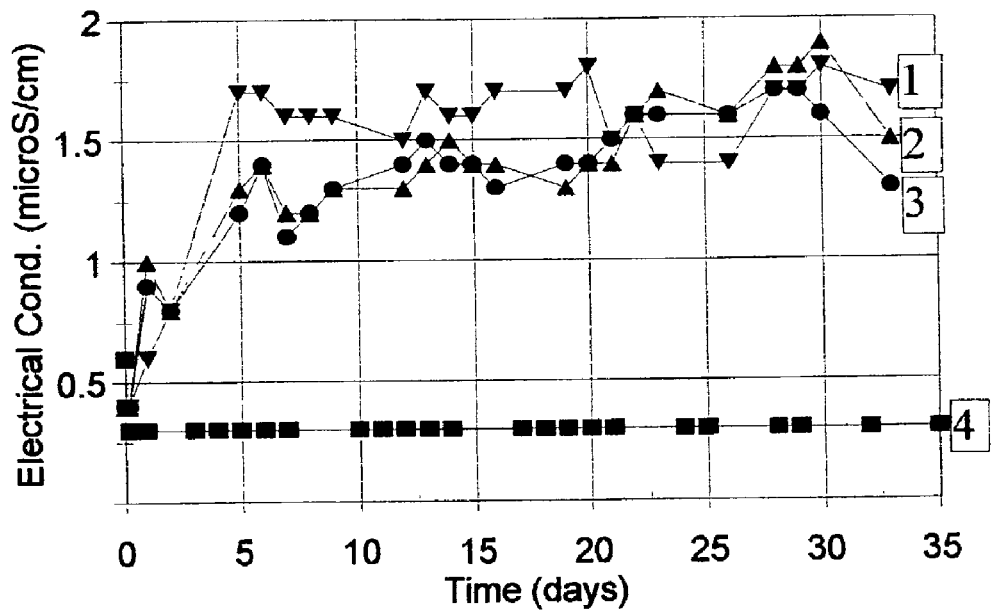
FIG. 3 is a plot of conductivities for several samples of coolant fluids obtained over an extended period in accordance with the procedures described in Example 16.
Figure 4:
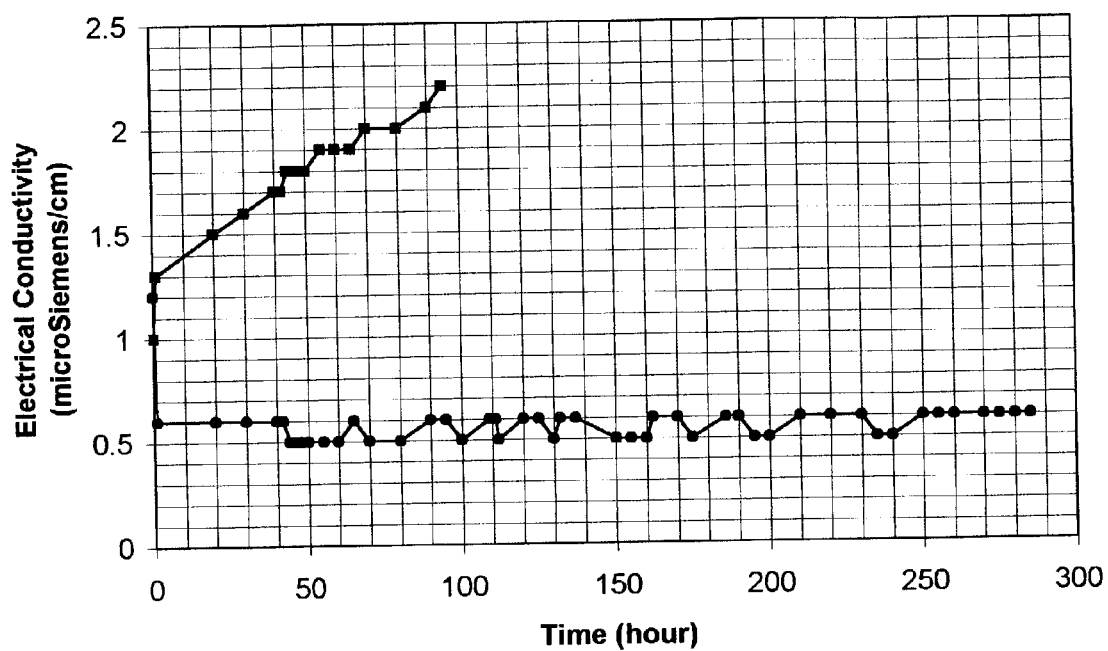
FIG. 4 is a plot of conductivities for two samples of coolant fluids obtained in a dynamic test over an extended period of time in accordance with the procedures described in Example 17.

The conductivity readings for the different coolant fluids during the four separate runs were plotted on the graph shown in FIG. 3 where the data points from Run 1 were plotted using inverted triangles, the data points for Run2 were plotted using triangles, the data points for Run 3 were plotted using dots, and the data points for Run 4 were plotted using squares. It will be noticed that in Runs 1, 2, and 3, the conductivity of the coolant fluids in each run rose to level of greater than 1.0 μSiemens/cm within 5 days of commencement of each of these runs. It can also be seen that the conductivity levels of the coolant fluids in Runs 1 through 3 all remained in the range of about 1.25 to about 1.75 μSiemens/cm during the periods from 10 to 33 days.

As distinguished from the performance of the coolant fluids in Runs 1 through 3, the conductivity of the coolant fluid containing the additive package of both an organic corrosion inhibitor and a polymeric ion suppressant in accordance with this invention used in Run 4 dropped to the lowest conductivity level that the instrumentation was capable of reading (i.e., 0.3 μSiemens/cm) in the first day and that the conductivity level of this coolant fluid remained at a level of less than 0.3 μSiemens/cm for a period of 35 days.

Example 17

In this Example two different coolant fluids were separately tested in the apparatus illustrated in FIG. 2. One of the coolants was a mixture of 55% by volume propylene glycol and 45% by volume DI water. The other coolant fluid was a material in accordance with this invention and was comprised of 55% by volume propylene glycol and 45% DI water, to which mixture was added 0.1% by volume benzotriazole and 0.05% by volume of the polymeric ion suppressant described above as A10.

In a first test run, the coolant reservoir 210 was charged with the coolant fluid containing only propylene glycol and DI water. The heater 214 was turned on and the coolant fluid was circulated through the apparatus until the coolant fluid achieved a temperature of 70° C. at which time the first conductivity reading by means of conductivity probe 223 was recorded at time zero. The temperature of the coolant fluid was maintained at a temperature of 70° C. during the course of the test run by means of temperature controller 216. The initial conductivity recorded was about 1.0 μSiemens/cm, but the conductivity almost immediately jumped to about 1.3 μSiemens/cm. As this test run continued, the conductivity of the coolant fluid increased steadily until it reached a magnitude of about 2.2 μSiemens/cm. This test run was discontinued at this time.

In a second test run, the coolant fluid of this invention (containing both benzotriazole and the polymeric ion suppressant) was employed. In a similar manner, the coolant fluid was charged to the coolant reservoir 210, the heater 214 was turned on and the coolant fluid was circulated through the apparatus until the coolant fluid achieved a temperature of 70° C. at which time measurement of the conductivity of the coolant fluid was commenced by means of conductivity probe 213. The temperature of 70° C. was maintained throughout the rune by means of temperature controller 216.

Although the initial conductivity reading at time zero was about 1.2 μSiemens/cm, the conductivity of this coolant fluid immediately dropped to about 0.6 μSiemens/cm and remained in the range of from about 0.5 to about 0.6 μSiemens/cm for a period of over 280 hours, when the run was terminated.

From the showings of the above Examples it can be seen that the heat transfer or coolant fluids of this invention which include an organic corrosion inhibitor and a polymeric ion suppressant are capable of maintaining low levels of conductivity over extended periods of time compared to similar cooling materials that do not contain both a corrosion inhibitor and an ion suppressant.

I claim:

1. A fuel cell comprising an anode, a cathode, and a coolant recirculating in a loop, said coolant composition comprising de-ionized water, an organic corrosion inhibitor, an organic freezing point depressant, and an ion exchange resin suspended in the coolant, wherein the de-ionized water is present in an amount of from about 10 to about 90 per cent by volume of the de-ionized water and the organic freezing point depressant, the organic freezing point depressant is present in an amount of from about 90 to about 10 per cent by volume of the de-ionized water and freezing point depressant, the organic corrosion inhibitor is present in an amount of from about 0.01 to about 5 per cent by weight of the coolant composition, and the ion exchange resin is present in an amount of from about 0.01 to about 4 per cent by weight of the coolant composition.

2. The fuel cell of claim 1 wherein the corrosion inhibitor is selected from the group consisting of azoles, aromatic hydroxy compounds, amines and combinations thereof.

3. The fuel cell of claim 2 wherein the azoles is selected from the group consisting of benzotriazole, tolyltriazole, methyl benzotriazoles, mercaptobenzoimidazole and mercaptobenzothiazole.

4. The fuel cell of claim 2 wherein the aromatic hydroxy compounds is selected from the group consisting of salicylaldoxime, salicyl alcohol, methyl gallate, propyl gallate, octyl gallate and dodecyl gallate.

5. The fuel cell of claim 2 wherein the amines is selected from the group consisting of monoethanol amine, diethanol amine, methanol amine and morpholine.

6. A fuel cell comprising an anode, a cathode, and a coolant recirculating in a loop, said coolant composition comprising:
   de-ionized water,
   an organic corrosion inhibitor, and
   an ion exchange resin suspended in the coolant, said ion exchange resin having a size of from about 0.1 micron to about 100 micron.

7. The fuel cell of claim 6 wherein the ion exchange resin is present in an amount of from about 0.01 percent to about 4 percent by weight of the coolant composition.

* * * * *